United States Patent
Kao et al.

(10) Patent No.: US 11,138,327 B2
(45) Date of Patent: Oct. 5, 2021

(54) PRIVACY DATA INTEGRATION METHOD AND SERVER

(71) Applicant: INDUSTRIAL TECHNOLOGY RESEARCH INSTITUTE, Hsinchu (TW)

(72) Inventors: Ming-Chih Kao, Taipei (TW);
Pang-Chieh Wang, Taipei (TW);
Chia-Mu Yu, Kaohsiung (TW);
Pin-Hui Lu, Taichung (TW);
Kai-Cheng Liu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 417 days.

(21) Appl. No.: 16/234,203

(22) Filed: Dec. 27, 2018

(65) Prior Publication Data

US 2020/0210605 A1 Jul. 2, 2020

(51) Int. Cl.
*G06F 21/62* (2013.01)
*G06N 7/00* (2006.01)

(52) U.S. Cl.
CPC ......... *G06F 21/6218* (2013.01); *G06N 7/005* (2013.01)

(58) Field of Classification Search
CPC .................. G06F 21/6218; G06N 7/005
See application file for complete search history.

(56) References Cited

U.S. PATENT DOCUMENTS

| | | | |
|---|---|---|---|
| 8,145,682 B2 | 3/2012 | McSherry et al. | |
| 8,639,649 B2 | 1/2014 | McSherry et al. | |
| 10,467,201 B1 * | 11/2019 | Merritt | G06F 16/215 |
| 2015/0016604 A1 | 1/2015 | Bellare et al. | |
| 2016/0352709 A1 | 12/2016 | Nunally et al. | |
| 2018/0211033 A1 | 7/2018 | Aditham et al. | |
| 2018/0336264 A1 | 11/2018 | Barday et al. | |
| 2020/0134446 A1 * | 4/2020 | Soni | G06N 3/08 |
| 2020/0153742 A1 * | 5/2020 | Lee | H04L 47/41 |

FOREIGN PATENT DOCUMENTS

| | | |
|---|---|---|
| CN | 101063966 A | 10/2007 |
| CN | 107909621 A | 4/2018 |
| CN | 108259158 A | 7/2018 |

(Continued)

OTHER PUBLICATIONS

Abadi et al., "Deep Learning with Differential Privacy", 2016, 23 pages.

(Continued)

*Primary Examiner* — Hee K Song
(74) *Attorney, Agent, or Firm* — Birch, Stewart, Kolasch & Birch LLP

(57) ABSTRACT

A privacy data integration method and a server are provided. The privacy data integration method includes the following steps. A first processing device and a second processing device respectively obtain a first generative model and a second generative model according to a first privacy data and a second privacy data. A server generates a first generative data and a second generative data via the first generative model and the second generative model respectively. The server integrates the first generative data and the second generative data to obtain a synthetic data.

22 Claims, 8 Drawing Sheets

(56) References Cited

FOREIGN PATENT DOCUMENTS

| | | |
|---|---|---|
| CN | 109309652 A | 2/2019 |
| TW | 201331770 A | 8/2013 |
| TW | 201428684 A | 7/2014 |
| TW | 201727516 A | 8/2017 |
| TW | 201818285 A | 5/2018 |
| WO | WO 2018/057302 A1 | 3/2018 |

OTHER PUBLICATIONS

Beaulieu-Jones et al., "Privacy-preserving generative deep neural networks support clinical data sharing", Jul. 5, 2017, 16 pages.

Chen et al., "Differentially Private High-Dimensional Data Publication via Sampling-Based Inference", Proceedings of the 21th ACM SIGKDD International Conference on Knowledge Discovery and Data Mining, Aug. 2015, 10 pages.

Danezis et al., "Differentially Private Billing with Rebates", 2011, 22 pages.

Doersch, "Tutorial on Variational Autoencoders", Aug. 13, 2016, 23 pages.

Dwork et al., "Calibrating Noise to Sensitivity in Private Data Analysis", Theory of Cryptography Conference, 2006, 20 pages.

McMahan et al., "Communication-Efficient Learning of Deep Networks from Decentralized Data", Proceedings of the 20th International Conference on Artificial Intelligence and Statistics, vol. 54, 2017, 11 pages.

McMahan et al., "Federated Learning: Collaborative Machine Learning without Centralized Training Data", Google AI Blog, Apr. 6, 2017, https://ai.googleblog.com/2017/04/federated-learning-collaborative.html.

Meyer, "Notes on Variational Autoencoders" Jan. 17, 2016, 14 pages.

Nishio et al., "Client Selection for Federated Learning with Heterogeneous Resources In Mobile Edge", Oct. 30, 2018, 7 pages.

Ren et al., "LoPub: High-Dimensional Crowdsourced Data Publication With Local Differential Privacy", IEEE Transactions on Information Forensics and Security, vol. 13, No. 9, Sep. 2018, 16 pages.

Retrieved Dec. 13, 2018, 1 page, https://www.rdocumentation.org/packages/StatMatch/versions/1.2.5/topics/NND.hotdeck.

Retrieved Dec. 13, 2018, 10 pages, https://blog.stata.com/2016/11/15/introduction-to-bayesian-statistics-part-2-mcmc-and-the-metropolis-hastings-algorithm/.

Retrieved Dec. 13, 2018, 10 pages, https://www.jianshu.com/p/36d8b7182f6b.

Retrieved Dec. 13, 2018, 14 pages, https://blog.csdn.net/lin360580306/article/details/S1240398.

Retrieved Dec. 13, 2018, 2 pages, https://github.com/michaelfarrell76/Distributed-SGD.

Retrieved Dec. 13, 2018, 2 pages, https://github.com/SEI-ENERGY/Residential-Energy . . . . .

Retrieved Dec. 13, 2018, 4 pages, https://archive.ics.uci.edu/ml/datasets/wine.

Retrieved Dec. 17, 2018, 1 page, https://github.com/open-source-economics/taxdata/tree/master/puf_data/StatMatch.

Shokri et al., "Privacy-Preserving Deep Learning", Proceedings of the 22nd ACM SIGSAC Conference on Computer and Communications Security, Oct. 2015, 12 pages.

Shweta S A, "Secure and Privacy Healthcare Systems Based On Big Data Analytics in Mobile Cloud Computing", International Journal of Computer Engineering and Applications, vol. 12, May 18, 7 pages.

Takbiri et al., "Privacy against Statistical Matching: Inter-User Correlation", Jun. 28, 2018, 5 pages.

Templ et al., "Introduction to Statistical Disclosure Control (SDC)" Data-Analysis OG, May 16, 2018, 31 pages.

Zhang et al., "Differentially Private Releasing via Deep Generative Model (Technical Report)", Mar. 25, 2018, 12 pages.

Zhang et al., "PrivBayes: Private Data Release via Bayesian Networks", Proceedings of the ACM SIGMOD International Conference on Management of Data, 2014, 12 pages.

Taiwanese Notice of Allowance and Search Report for Taiwanese Application No. 108116621, dated Aug. 17, 2020.

\* cited by examiner

PD41

| EC | IC | DA |
|----|----|-----|
| 1 | 3 | 302 |
| 2 | 3 | 310 |
| 1 | 1 | 111 |
| 2 | 2 | 220 |
| 2 | 3 | 350 |
| 1 | 2 | 280 |
| 2 | 1 | 159 |

PD42

| NR | IC | DA | Absolute value of error with 302 | Absolute value of error with 310 |
|----|----|-----|---|---|
| 0 | 3 | 300 | 2 | 189 |
| 1 | 3 | 315 | 13 | 204 |
| 3 | 1 | 113 | 189 | 2 |
| 4 | 2 | 225 | 77 | 114 |
| 1 | 3 | 351 | 49 | 240 |
| 2 | 2 | 288 | 4 | 177 |
| 3 | 1 | 160 | 142 | 49 |

PD41

| EC | IC | DA |
|----|----|-----|
| 1 | 3 | 302 |
| 2 | 3 | 310 |
| 1 | 1 | 111 |
| 2 | 2 | 220 |
| 2 | 3 | 350 |
| 1 | 2 | 280 |
| 2 | 1 | 159 |

PD42

| NR | IC | DA |
|----|----|-----|
| 0 | 3 | 300 |
| 1 | 3 | 315 |
| 3 | 1 | 113 |
| 4 | 2 | 225 |
| 1 | 3 | 351 |
| 2 | 2 | 288 |
| 3 | 1 | 160 |

SD43

| EC | IC | NR |
|----|----|-----|
| 1 | 3 | 0 |
| 2 | 3 | 1 |
| 1 | 1 | 3 |
| 2 | 2 | 4 |
| 2 | 3 | 1 |
| 1 | 2 | 2 |
| 2 | 1 | 3 |

FIG. 2C

JPD53

| | EC=1, IC=1 | EC=1, IC=2 | EC=1, IC=3 | EC=2, IC=1 | EC=2, IC=2 | EC=2, IC=3 | Total |
|---|---|---|---|---|---|---|---|
| NR=0 | 0 | 0 | 2/12 | 0 | 0 | 0 | 2/12 |
| NR=1 | 0 | 1/12 | 0 | 0 | 0 | 1/12 | 2/12 |
| NR=2 | 1/12 | 1/12 | 0 | 0 | 0 | 0 | 2/12 |
| NR=3 | 1/12 | 0 | 1/12 | 1/12 | 1/12 | 0 | 4/12 |
| NR=4 | 0 | 1/12 | 0 | 0 | 1/12 | 0 | 2/12 |
| Total | 2/12 | 3/12 | 3/12 | 1/12 | 2/12 | 1/12 | 1 |

JPD53'

| | EC=1 | EC=2 | Total |
|---|---|---|---|
| NR=0 | 1/7 | 0 | 1/7 |
| NR=1 | 0 | 2/7 | 2/7 |
| NR=2 | 1/7 | 0 | 1/7 |
| NR=3 | 1/7 | 1/7 | 2/7 |
| NR=4 | 0 | 1/7 | 1/7 |
| Total | 3/7 | 4/7 | 1 |

| | IC=1 | IC=2 | IC=3 | Total |
|---|---|---|---|---|
| NR=0 | 0 | 0 | 1/7 | 1/7 |
| NR=1 | 0 | 0 | 2/7 | 2/7 |
| NR=2 | 0 | 1/7 | 0 | 1/7 |
| NR=3 | 2/7 | 0 | 0 | 2/7 |
| NR=4 | 0 | 1/7 | 0 | 1/7 |
| Total | 2/7 | 2/7 | 3/7 | 1 |

FIG. 7

PRIVACY DATA INTEGRATION METHOD AND SERVER

TECHNICAL FIELD

The disclosure relates in general to a privacy data integration method and a server.

BACKGROUND

For some business purposes, companies may need to share customer data with each other. The columns of different customer datum may be different, so making data integration is quite difficult. A data integration method is needed for those companies.

In addition, customer data may have some private information. There may be concerns about leaking customer privacy data during the data integration process. Therefore, how to develop an integration method with privacy protection has become an important development direction of big data technology.

SUMMARY

The disclosure is directed to a privacy data integration method and a server.

According to one embodiment, a privacy data integration method is provided. The privacy data integration method includes the following steps. A first processing device and a second processing device respectively obtain a first generative model and a second generative model according to a first privacy data and a second privacy data. A server generates a first generative data and a second generative data via the first generative model and the second generative model respectively. The server integrates the first generative data and the second generative data to obtain a synthetic data.

According to another embodiment, a server for performing a privacy data integration method is provided. The privacy data integration method includes the following steps. A first generative data and a second generative data are respectively generated via a first generative model and a second generative model which are obtained according to a first privacy data and a second privacy data. The first generative data and the second generative data are integrated to obtain a synthetic data.

BRIEF DESCRIPTION OF THE DRAWINGS

FIG. 2C illustrates a statistical match algorithm to perform the horizontal data integration according to an exemplary embodiment.

FIG. 7 shows a joint probability distribution according to another embodiment.

Figure 1:
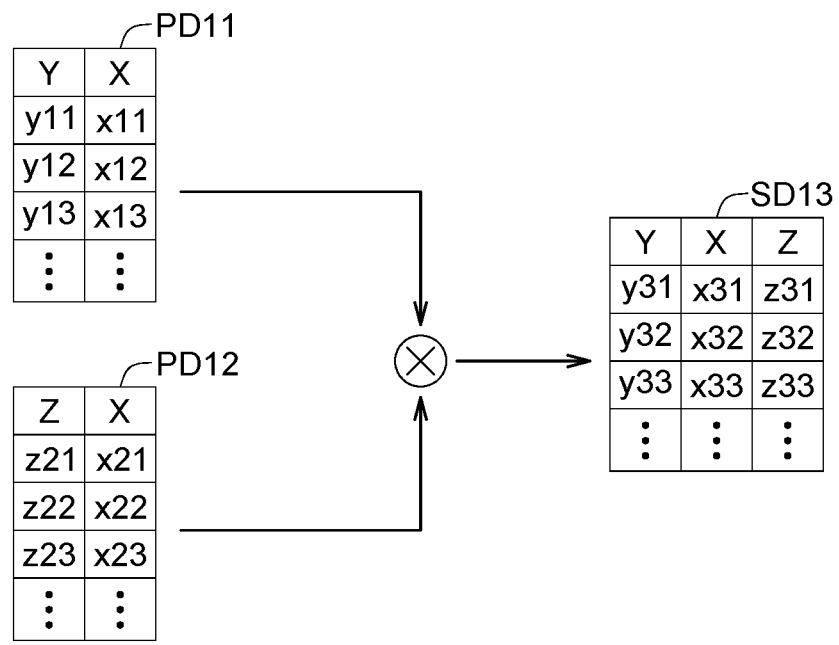
FIG. 1 illustrates an architecture of horizontal data integration according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1 which illustrates an architecture of horizontal data integration according to an exemplary embodiment. A first privacy data PD11 having columns Y, X includes contents "(y11, x11), (y12, x12), (y13, x13), ..." and a second privacy data PD12 having columns Z, X includes contents "(z21, x21), (z22, x22), (z23, x23), ...."

The first privacy data PD11 and the second privacy data PD12 can be integrated to be a synthetic data SD13 having columns Y, X, Z. For example, the synthetic data SD13 includes contents "(y31, x31, z31), (y32, x32, z32), (y33, x33, z33), ..." The columns Y, X of the synthetic data SD13 and the columns Y, X of the first privacy data PD11 have similar joint probability distributions, and the columns Z, X of the synthetic data SD13 and the columns. Z, X of the second privacy data PD12 have similar joint probability distributions. Therefore, the synthetic data SD13 could represent the first privacy data PD11 and the second privacy data PD12.

Moreover, contents "(y11, x11), (y12, x12), (y13, x13), ..." of the first privacy data PD11 and contents "(z21, x21), (z22, x22), (z23, x23), ..." of the second privacy data PD12 are not shown in the synthetic data SD13. Therefore, this data integration is performed with privacy protection.

Figure 2A:
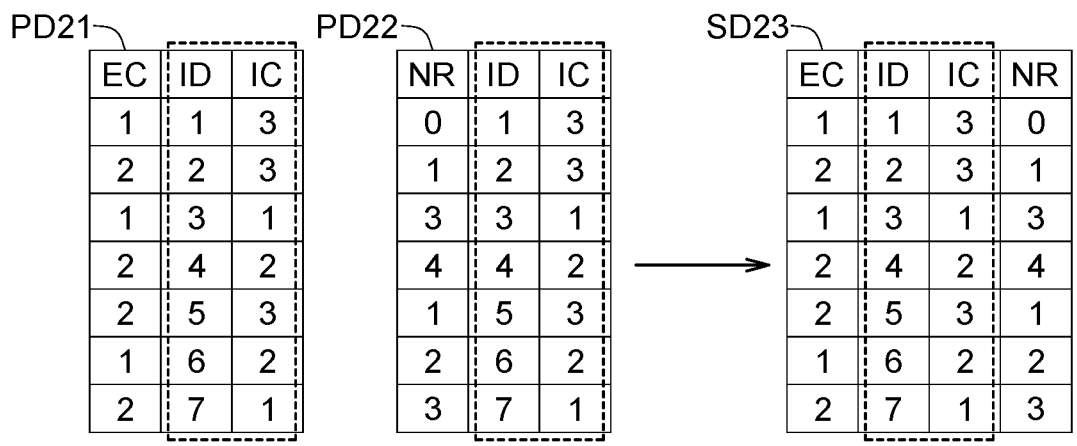
FIG. 2A illustrates a database join algorithm to perform the horizontal data integration according to an exemplary embodiment.

Please referring to FIG. 2A, which illustrates a database join algorithm to perform the horizontal data integration according to an exemplary embodiment. A first privacy data PD21 has columns EC, ID, IC. The column EC is the energy consumption level, the column ID is the user identification, and the column IC is the income level. The user identification is a direct identifier, and the energy consumption level and the income level are indirect identifiers. The direct identifier can be used to point to someone directly; the indirect identifier cannot be used to point to someone directly. A second privacy data PD22 has columns NR, ID, IC. The column NR is the total number of rooms. The total number of rooms is an indirect identifier. In the database join algorithm, the columns ID and IC are used to be joint keys. For example, the contents of the column ID of the first privacy data PD21 (or the second privacy data PD22) are filled in the column ID of a synthetic data SD23. The contents of the column EC of the first privacy data PD21 are filled in the column EC of the synthetic data SD23 according to the contents of the column EC of the first privacy data PD21. The contents of the column NR of the second privacy data PD22 are filled in the column NR of the synthetic data SD23 according to the contents of the column ID of the second privacy data PD22. The contents of the column IC of the first privacy data PD21 (or the second privacy data PD22) are filled in the column IC of the synthetic data SD23 according to the contents of the column ID of the first privacy data PD21 (or the second privacy data PD22).

Figure 2B:
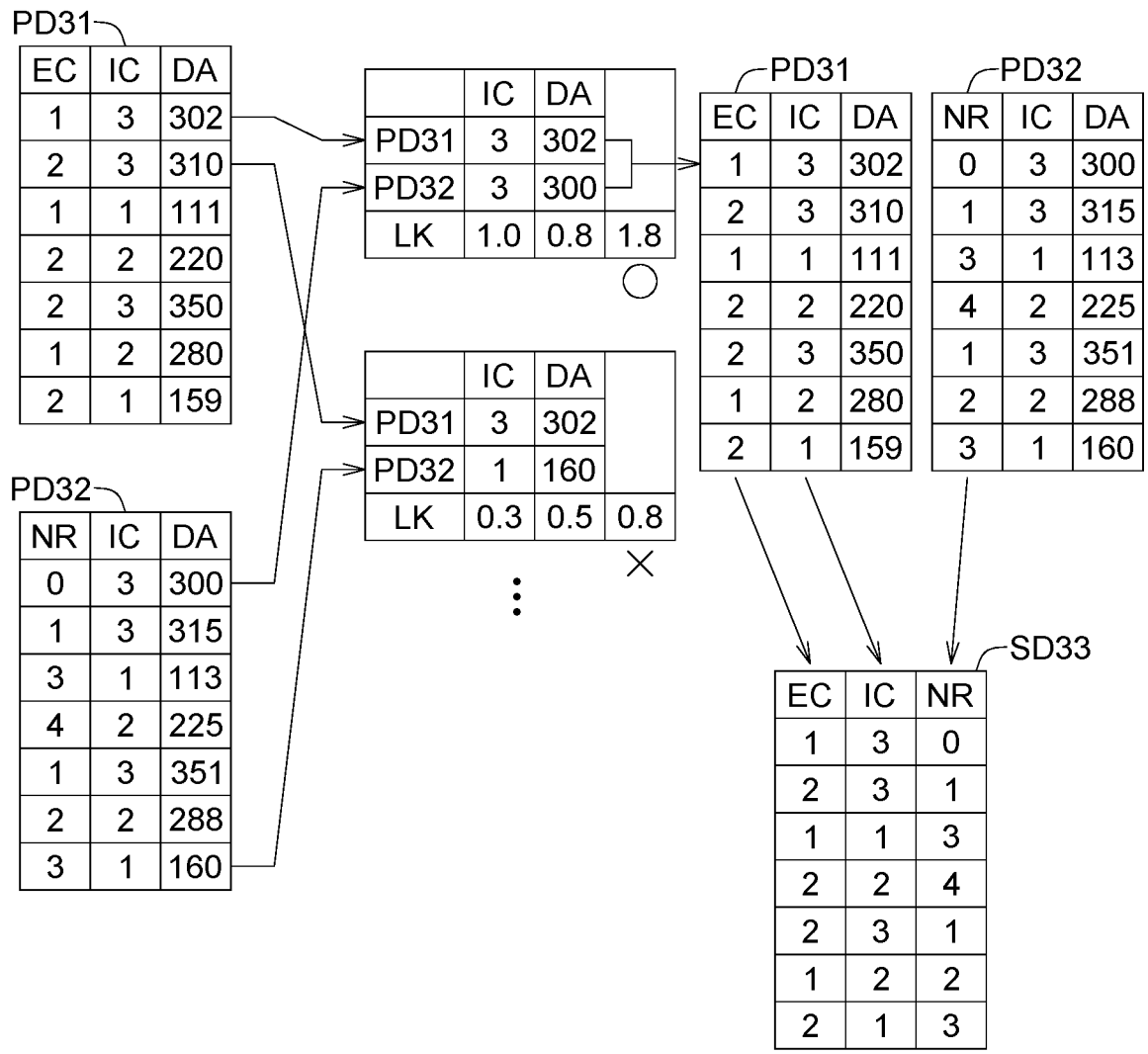
FIG. 2B illustrates a record linkage algorithm to perform the horizontal data integration according to an exemplary embodiment.

Please referring to FIG. 2B, which illustrates a record linkage algorithm to perform the horizontal data integration according to an exemplary embodiment. A first privacy data PD31 has columns EC, IC, DA. The column EC is the energy consumption level, the column IC is the income level, and the column DA is the debt amount. The energy consumption level, the income level and the debt amount are indirect identifiers. A second privacy data PD32 has columns NR, IC, DA. The column NR is the total number of rooms. The total number of rooms is an indirect identifier. In the record linkage algorithm, the common columns IC and DA are used to calculate a linkage score LK. For example, the linkage score LK of the first row of the first privacy data PD31 and the first row of the second privacy data PD32 is 1.8. The linkage score LK of the first row of the first privacy data PD21 and the seventh row of the second privacy data PD22 is 0.8. The first privacy data PD31 and the second privacy data PD32 are linked according to the linkage score LK. Then, a synthetic data SD33 having columns EC, IC, NR is obtained.

Please referring to FIG. 2C, which illustrates a statistical match algorithm to perform the horizontal data integration according to an exemplary embodiment. A first privacy data PD41 has columns EC, IC, DA. The column EC is the energy consumption level, the column IC is the income level, and the column DA is the debt amount. The energy consumption level, the income level and the debt amount are indirect identifiers. A second privacy data PD42 has columns NR, IC, DA. The column NR is the total number of rooms. The total number of rooms is an indirect identifier. In the first statistical match algorithm, the common column DA is used to calculate an absolute value of error. For example, for the column DA of the second privacy data PD22, the absolute value of errors with 302 (the first row in the column DA of the first privacy data PD41) are "2, 13, 189, 77, 49, 4, 142." For the column DA of the second privacy data PD42, the absolute value of errors with 310 (the second row in the column DA of the first privacy data PD41) are "189, 204, 2, 114, 240, 177, 49." The first privacy data PD41 and the second privacy data PD42 are linked according to the absolute value of errors. Then, a synthetic data SD43 having columns EC, IC, NR is obtained.

Figure 3:
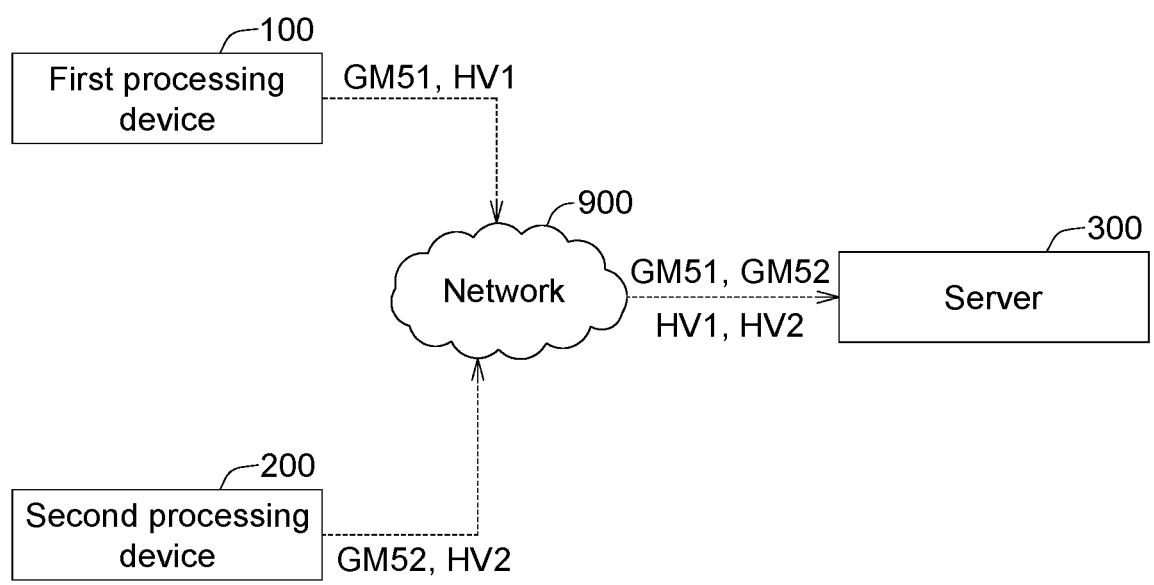
FIG. 3 shows a first processing device, a second processing device and a server according to one embodiment.
Figure 4:
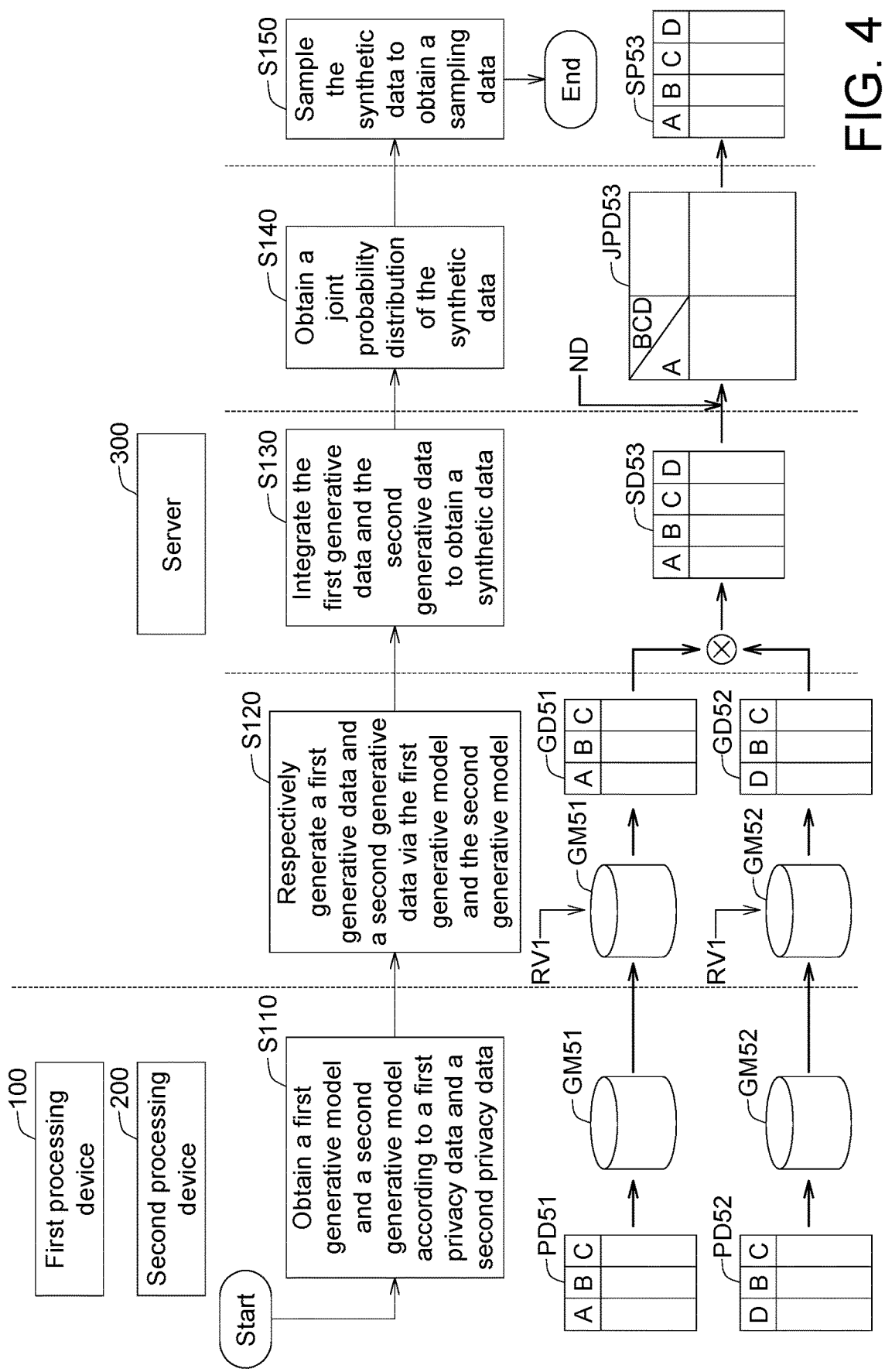
FIG. 4 shows a flowchart of a privacy data integration method according to one embodiment.

Please refer to FIGS. 3 to 4. FIG. 3 shows a first processing device 100, a second processing device 200 and a server 300 according to one embodiment. FIG. 4 shows a flowchart of a privacy data integration method according to one embodiment. Each of the first processing device 100 and the second processing device 200 may be, but not limited to, a computer, a chip or a circuit board. The first processing device 100 is disposed at one company and the second processing device 200 is disposed at another company. The server 300 may be a computer, a cloud computing center, a computing cluster system or an Edge computing system. The server 300 is disposed at a third party. The first processing device 100 and the server 300 may be communicated with the network 900, and the second processing device 200 and the server 300 may be communicated with the network 900. The privacy data integration method is illustrated via the first processing device 100, the second processing device 200 and the server 300.

In step S110, the first processing device 100 and the second processing device 200 respectively obtain a first generative model GM51 and a second generative model GM52 according to a first privacy data PD51 and a second privacy data PD52. For example, the first privacy data PD51 has columns A, B, and C and the second privacy data PD52 has columns D, B, C. A generative model is a model of the conditional probability of the observable X, given a target y, symbolically, P(X|Y=y). A categorical content of the first privacy data PD51 or the second privacy data PD52 is transformed to be a numerical content. The first privacy data PD51 and the second privacy data PD52 are not directly transmitted to the server 300. Instead, the parameters of the first generative model GM51 and the parameters of the second generative model GM52 are transmitted to the server 300.

Next, in step S120, the server 300 generates a first generative data GD51 and a second generative data GD52 via the first generative model GM51 and the second generative model GM52. The first generative model or the second generative model is obtained via a generative algorithm, such as a Variational Auto-Encoder VAE algorithm or a Generative Adversarial Network (GAN) algorithm. In this step, a random vector RV1 is inputted the first generative model GM51, and then the first generative model GM51 outputs the first generative data GD51. The first generative data GD51 and the first privacy data PD51 are different, but have similar joint probability distributions. Also, another random vector RV2 is inputted the second generative model GM52, and then the second generative model GM52 outputs the second generative data GD52. The second generative data GD52 and the second privacy data PD52 are different, but have similar joint probability distributions.

Then, in step S130, the server 300 integrates the first generative data GD51 and the second generative data GD52 to obtain a synthetic data SD53. In the step S130, the first generative data GD51 and the second generative data GD52 may be integrated via the database join algorithm (For example: illustrated as FIG. 2A), the record linkage algorithm (For example: illustrated as FIG. 2B) or the statistical match algorithm (For example: illustrated as FIG. 2C).

Figure 5:
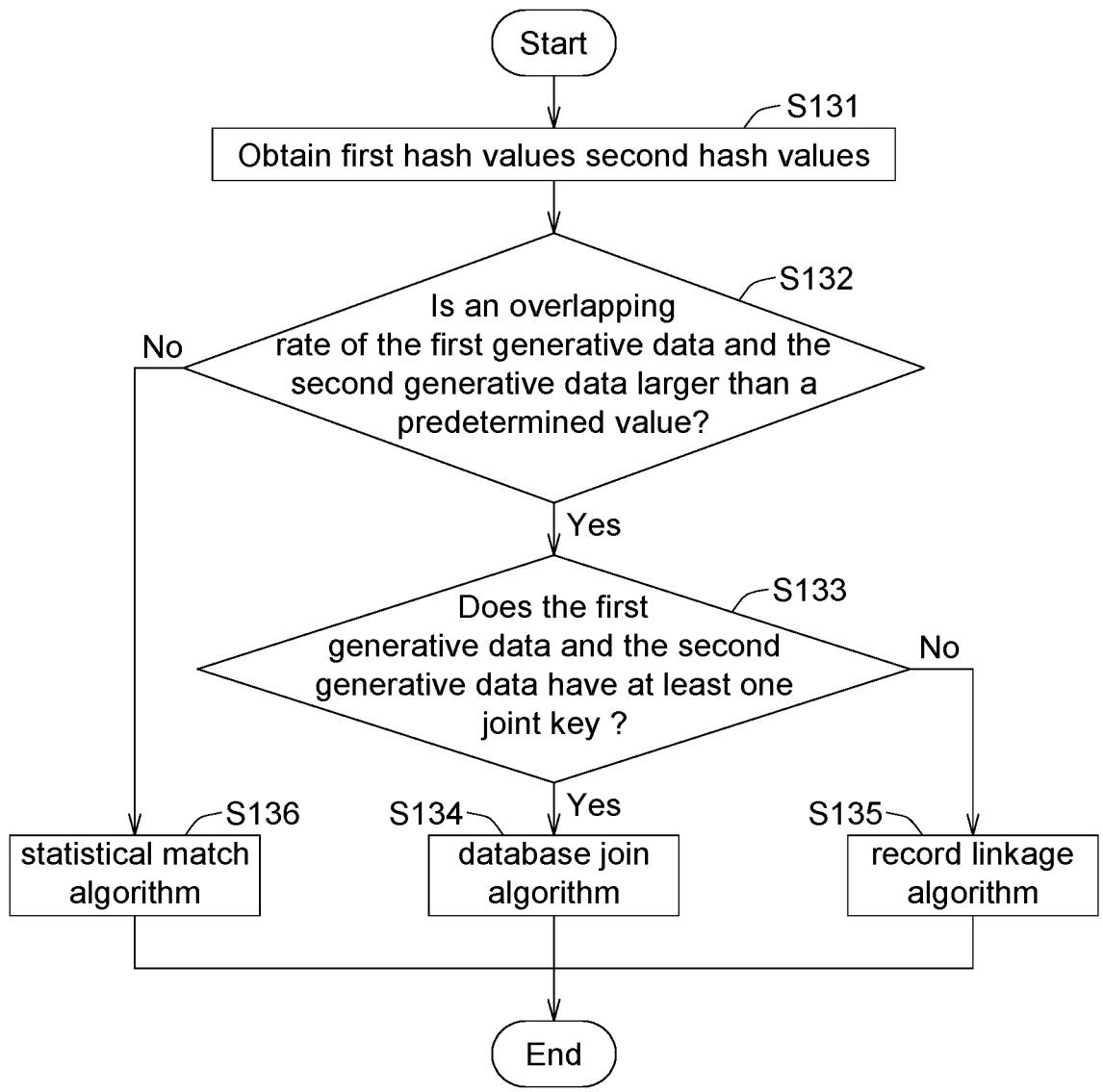
FIG. 5 shows a flowchart for selecting the database join algorithm, the record linkage algorithm or the statistical match algorithm according to an exemplary embodiment.

Please refer to FIG. 5, which shows a flowchart for selecting the database join algorithm, the record linkage algorithm or the statistical match algorithm according to an exemplary embodiment. In step S131, the server 300 obtains first hash values HV1 (shown in FIG. 3) of the first privacy data PD51 and second hash values HV2 (shown in FIG. 3) of the second privacy data PD52 from the first processing device 100 and the second processing device 200. The first hash values HV1 are obtained by encoding the content of a direct identifier or a representative indirect identifier of the first privacy data PD51. The second hash values HV2 are obtained by encoding the content of a direct identifier or a representative indirect identifier of the second privacy data PD52.

In step S132, the server 300 determines whether an overlapping rate of the first generative data GD51 and the second generative data GD52 is larger than a predetermined value by comparing the first hash values HV1 and the second hash values HV2. The overlapping rate of the first generative data GD51 and the second generative data GD52 is the proportion of repeat content. If the overlapping rate is not larger than the predetermined value, then the process proceeds to step S136; if the overlapping rate is larger than the predetermined value, then the process proceeds to step S133.

In step S133, the server 300 determines whether the first generative data GD51 and the second generative data GD52 have at least one joint key. If the first generative data GD51 and the second generative data GD52 have the joint key, then the process proceeds to step S134; if the first generative data GD51 and the second generative data GD52 do not have the joint key, then the process proceeds to step S135.

In step S134, the server 300 integrates the first generative data GD51 and the second generative data GD52 via the database join algorithm (illustrated as FIG. 2A).

In step S135, the server 300 integrates the first generative data GD51 and the second generative data GD52 via the record linkage algorithm (illustrated as FIG. 2B). In this step, the first generative data GD51 and the second generative data GD52 may be integrated via the record linkage algorithm without any joint key.

In step S136, the server 300 integrates the first generative data GD51 and the second generative data GD52 via the statistical match algorithm (illustrated as FIG. 2C).

Figure 6:
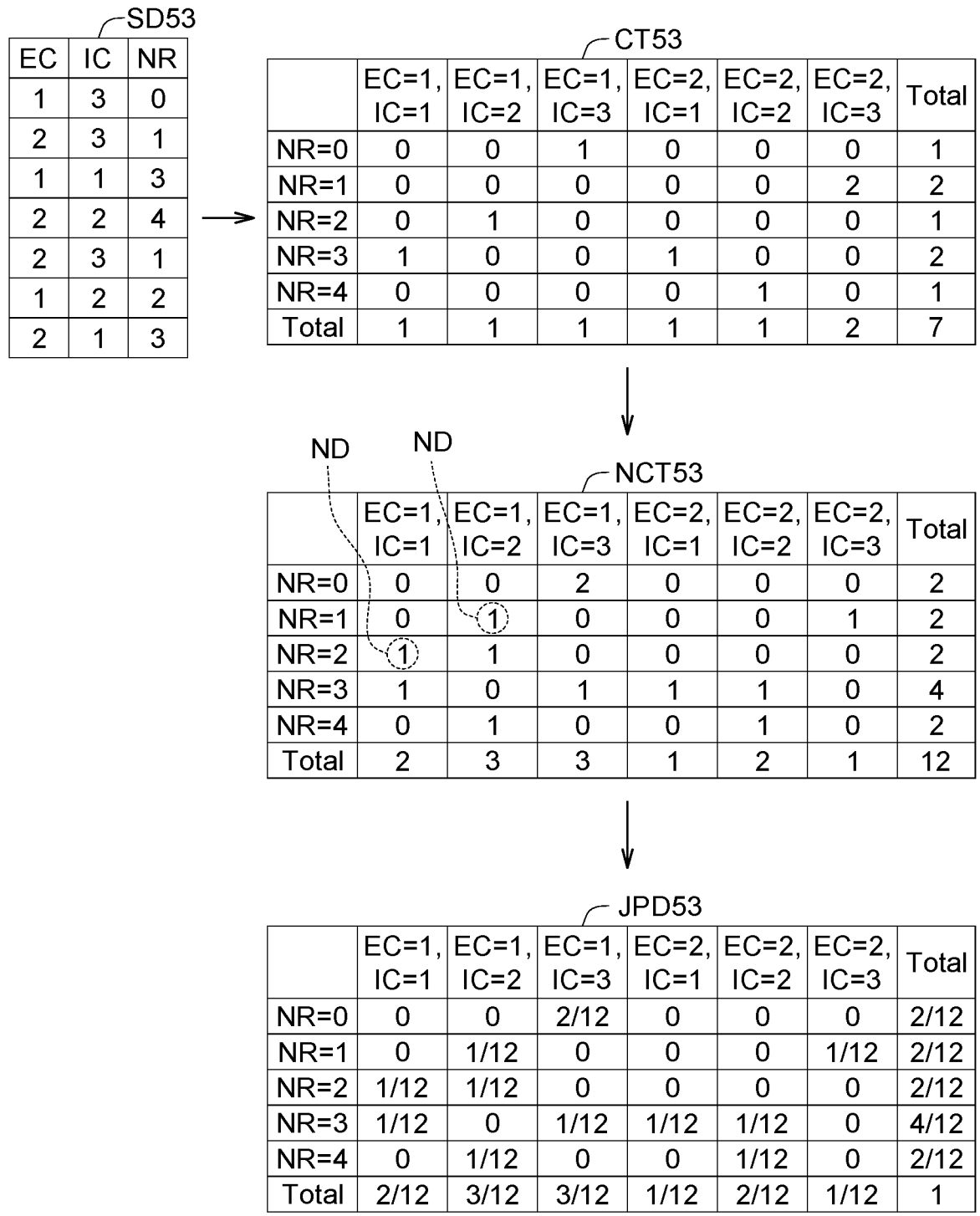
FIG. 6 illustrates the process of obtaining the joint probability distribution according to an exemplary embodiment.

In step S140 of FIG. 4, the server 300 obtains a joint probability distribution JPD53 of the synthetic data SD53. In the step S140, a noise data ND is added into the joint probability distribution JPD53. Refer to FIG. 6, which illustrates the process of obtaining the joint probability distribution JPD53 according to an exemplary embodiment. At first, the synthetic data SD53 is transformed to be a contingency table CT53. The count for each combination of the columns EC, IC, NR is filled in the contingency table CT53. Then, the noise data ND is added into the contingency table CT53 to obtain a noisy contingency table NCT53. Next, the counts in the noisy contingency table NCT53 are transformed into probability values to obtain the joint probability distribution JPD53.

Moreover, in another embodiment, the number of dimensions of the joint probability distribution JPD53 may be reduced. Please refer to FIG. 7 which shows a joint probability distribution JPD53' according to another embodiment. The joint probability distribution JPD53 whose number of dimensions is 3 is transformed to be the joint probability distribution JPD53' whose number of dimensions is 2. The complexity can be changed from $5^3$ to $5^2+5^2$, such that the computing loading may be reduced and the amount of computing time may be reduced.

Then, in the step S150 of FIG. 4, the server 300 samples the synthetic data SD53 according to the joint probability distribution JPD53 (or joint probability distribution JPD53') to obtain a sampling data SP53. The content of the sampling data SP53 is similar to the content of the first privacy data PD51 and the content of the second privacy data PD52.

Base on the privacy data integration method described above, the sampling data SP53 is obtained by integrating the first privacy data PD51 and the second privacy data PD52. The sampling data SP53 presents the similar contents of the first privacy data PD51 and the second privacy data PD52 without leaking any customer privacy data. It is very helpful for the big data technology. Moreover, the number of the privacy data is not limited in the present disclosure. For example, three or more privacy datum may be used to perform the privacy data integration method disclosed above.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A privacy data integration method, comprising:
   obtaining, by a first processing device and a second processing device respectively, a first generative model and a second generative model according to a first privacy data and a second privacy data;
   generating, by a server, a first generative data and a second generative data via the first generative model being inputted a random vector and the second generative model being inputted another random vector respectively, wherein the first generative data and the first privacy data are different, but have similar joint probability distributions; the second generative data and the second privacy data are different, but have similar joint probability distributions; and
   integrating, by the server, the first generative data and the second generative data to obtain a synthetic data.

2. The privacy data integration method according to claim 1, wherein in the step of obtaining the first generative model and the second generative model, the first generative model or the second generative model is obtained via a Variational Auto-Encoder VAE algorithm or a Generative Adversarial Network (GAN) algorithm.

3. The privacy data integration method according to claim 1, wherein in the step of obtaining the first generative model and the second generative model, a categorical content of the first privacy data or the second privacy data is transformed to be a numerical content.

4. The privacy data integration method according to claim 1, wherein the step of integrating the first generative data and the second generative data includes:
   integrating the first generative data and the second generative data via a database join algorithm, if the first generative data and the second generative data have at least one joint key.

5. The privacy data integration method according to claim 4, wherein the step of integrating the first generative data and the second generative data includes:
   integrating the first generative data and the second generative data via a statistical match algorithm, if an overlapping rate of the first generative data and the second generative data is not larger than a predetermined value.

6. The privacy data integration method according to claim 5, wherein the step of integrating the first generative data and the second generative data includes:
   integrating the first generative data and the second generative data via a record linkage algorithm, if an overlapping rate of the first generative data and the second generative data is larger than the predetermined value, and the first generative data and the second generative data do not have the joint key.

7. The privacy data integration method according to claim 1, further comprising:
   obtaining a joint probability distribution of the synthetic data.

8. The privacy data integration method according to claim 7, wherein the joint probability distribution is transformed to reduce a number of dimensions.

9. The privacy data integration method according to claim 7, wherein in the step of obtaining the joint probability distribution, a noise data is added into the joint probability distribution.

10. The privacy data integration method according to claim 7, further comprising:
    sampling the synthetic data to obtain a sampling data.

11. The privacy data integration method according to claim 10, wherein a content of the sampling data is similar to a content of the first privacy data and a content of the second privacy data.

12. A server for performing a privacy data integration method, comprising:
    a model generating hardware component, for respectively generating a first generative data and a second generative data via a first generative model being inputted a random vector and a second generative model being inputted another random vector according to a first privacy data and a second privacy data, wherein the first generative data and the first privacy data are different, but have similar joint probability distributions; the second generative data and the second privacy data are different, but have similar joint probability distributions; and an integrating hardware component, for integrating the first generative data and the second generative data to obtain a synthetic data.

13. The server according to claim 12, wherein the first generative model or the second generative model is obtained via a Variational Auto-Encoder VAE algorithm or a Generative Adversarial Network (GAN) algorithm.

14. The server according to claim 12, wherein a categorical content of the first privacy data or the second privacy data is transformed to be a numerical content.

15. The server according to claim 12, wherein the integrating hardware component integrates the first generative data and the second generative data via a database join algorithm, if the first generative data and the second generative data have at least one joint key.

16. The server according to claim 15, wherein the integrating hardware component integrates the first generative data and the second generative data via a statistical match algorithm, if an overlapping rate of the first generative data and the second generative data is not larger than a predetermined value.

17. The server according to claim 16, wherein the integrating hardware component integrates the first generative data and the second generative data via a record linkage algorithm, if an overlapping rate of the first generative data and the second generative data is not larger than the predetermined value, and the first generative data and the second generative data do not have the joint key.

18. The server according to claim 12, wherein a joint probability distribution of the synthetic data is obtained.

19. The server according to claim 18, wherein the joint probability distribution is transformed to reduce a number of dimensions.

20. The server according to claim 18, wherein a noise data is added into the joint probability distribution.

21. The server according to claim 18, wherein the synthetic data is sampled to obtain a sampling data.

22. The server according to claim 18, wherein a content of the sampling data is similar to a content of the first privacy data and a content of the second privacy data.

* * * * *